(12) United States Patent
Whittlesey

(10) Patent No.: US 6,401,885 B1
(45) Date of Patent: Jun. 11, 2002

(54) INTERNAL BRAKE MECHANISM FOR PLASTIC FILM FOR A PRODUCT FILLING MACHINE

(75) Inventor: Thomas E. Whittlesey, Apex, NC (US)

(73) Assignee: Tipper Tie, Inc., Wilmington, DE (US)

( * ) Notice: Subject to any disclaimer, the term of this patent is extended or adjusted under 35 U.S.C. 154(b) by 0 days.

(21) Appl. No.: 09/678,493

(22) Filed: Oct. 3, 2000

(51) Int. Cl.⁷ .................................................. F16F 9/36
(52) U.S. Cl. ........................ 188/322.16; 267/64.15; 452/37; 277/608
(58) Field of Search .................... 452/37, 53, 39, 452/45, 38; 188/322.16, 266.2, 266.5; 267/64.15; 277/602, 608, 609, 613

(56) References Cited

U.S. PATENT DOCUMENTS

| | | |
|---|---|---|
| 2,871,508 A | 2/1959 | Hill |
| 3,553,769 A * | 1/1971 | Myles et al. ................... 452/31 |
| 4,202,075 A * | 5/1980 | Michel et al. .................. 17/41 |
| 4,321,728 A * | 3/1982 | Marz .............................. 17/41 |
| 4,512,059 A | 4/1985 | Beckman |
| 4,675,945 A | 6/1987 | Evans et al. |
| 4,727,624 A | 3/1988 | Stanley |
| 4,792,127 A * | 12/1988 | Kortgen .................... 267/64.15 |
| 4,809,403 A | 3/1989 | Stanley |
| 4,887,332 A | 12/1989 | Evans et al. |
| 4,991,260 A * | 2/1991 | Nausedas ...................... 452/35 |
| 5,020,298 A | 6/1991 | Evans et al. |
| 5,042,234 A | 8/1991 | Stanley |
| 5,211,599 A | 5/1993 | Stanley |
| 5,273,482 A | 12/1993 | Beckman et al. |
| 5,378,193 A | 1/1995 | Stanley et al. |
| 5,466,184 A | 11/1995 | May |

FOREIGN PATENT DOCUMENTS

| | | |
|---|---|---|
| CH | 542 751 A | 10/1973 |
| EP | 0 004 013 A | 9/1979 |
| EP | 0 068 190 A | 1/1983 |
| EP | 0 432 351 A | 6/1991 |

\* cited by examiner

Primary Examiner—Christopher P. Schwartz
Assistant Examiner—Xuan Lan Nguyen
(74) Attorney, Agent, or Firm—Banner & Witcoff, Ltd.

(57) ABSTRACT

A brake mechanism which permits adjustment of the outer reach or extent of an elastomeric ring about the periphery of the brake. The adjustment is effected by engaging and bending the elastomeric ring seal to a greater or lesser extent depending upon the axial relationship of the component parts forming the brake.

9 Claims, 1 Drawing Sheet

INTERNAL BRAKE MECHANISM FOR PLASTIC FILM FOR A PRODUCT FILLING MACHINE

BACKGROUND OF THE INVENTION

In a principal aspect, the present invention relates to apparatus for controlling the release of rucked casing material on a product discharge horn especially when the rucked material has reduced plasticity.

Packaging of sausage products and other food products in casing material by discharge of the products from a tube or horn into the casing which has been rucked upon that horn is disclosed and taught in numerous prior art patents including the following:

| Patent No. | Issue Date | Title |
| --- | --- | --- |
| 4,887,332 | December 19, 1989 | Semi-Automatic Stuffing Machine, Casing Brake and Turret Assembly |
| 5,020,298 | June 4, 1991 | Continuously Rotating Platform With Multiple Mounted Double Clippers For Continuously Forming Link Product |

A problem often encountered with respect to such apparatus relates to the mechanism which is used to control the discharge of casing material that has been rucked upon the product discharge horn. Various types of braking mechanisms have been proposed over the years to control the release of casing removal in a manner which will prevent tears from forming in the casing yet will release the casing in a manner that product discharged into the casing will fill the casing uniformly and in a manner which provides an appealing product. Various prior art patents teach braking mechanisms including the following which are incorporated herewith by reference:

| Patent No. | Issue Date | Title |
| --- | --- | --- |
| 5,042,234 | August 27, 1991 | Collagen Film and Netting Packaging System and Method |
| 5,466,184 | November 14, 1995 | Device For Removing Surface Air in Casings |

Various other patents have been issued which disclose casing control and release mechanisms including the following:

| Patent No. | Issue Date | Title |
| --- | --- | --- |
| 4,809,403 | March 7, 1989 | Collapsible Presizing Rings |
| 4,727,624 | March 1, 1988 | Food Casing Presizing Device |
| 5,211,599 | May 18, 1993 | Adjustable Sizing Device for Tubular Food Casing |
| 5,273,482 | December 28, 1993 | Reinforced Casings for Preparing Dimensionally Uniform Processed Food Products With Flat Ends |
| 5,378,193 | January 3, 1995 | Vacuum Stuffing Horn and Method for Using Same |

While such apparatus are useful for controlling the discharge or release of casing material from a horn or tube, there has remained the problem of providing a method and mechanism for adjustment of the diameter of a brake mechanism to accommodate casing materials of differing elasticity or plasticity, different diameter and differing elongation and strength characteristics.

SUMMARY OF THE INVENTION

Briefly, the present invention comprises apparatus and a method for adjustably controlling the braking or release of casing material from a horn or tube. The apparatus includes a first ring member which is affixed or attached to the end of the tube and which is adapted to receive an annular seal carrier ring at the outside end of the tube. The annular carrier ring includes a flexible, elastomeric seal about the outer periphery which may be altered in shape to vary the effective diameter of the braking mechanism. The alteration in shape is effected by engaging the elastomeric seal with a section of the first ring member that may be varied in accord with the axial displacement of the carrier ring within the first ring member. Various other construction features of the invention include a variable diameter product discharge passage through the carrier ring for control of product discharge from the tube and a seal between the carrier ring and the tube.

Thus it is an object of the invention to provide an improved brake mechanism for controlling the release of casing material rucked upon a tube or product discharge horn.

It is a further object of the invention to provide an economically and efficiently constructed brake mechanism for use in combination with a product discharge tube or horn.

Another object of the invention is to provide an easily adjusted brake mechanism which permits easy alteration of the effective diameter of the brake in response to distinctive diameter requirements associated with the type of casing material and the diameter of the casing material.

Another object of the invention is to provide a brake mechanism which includes a construction that enables the adjustment of the product discharge orifice from the tube or horn.

These and other Invention will be set forth in the detailed description which follows.

BRIEF DESCRIPTION OF THE DRAWINGS

In the detailed description which follows reference will be made to the drawing comprised of the following figures.

DESCRIPTION OF THE PREFERRED EMBODIMENT

Figure 1:
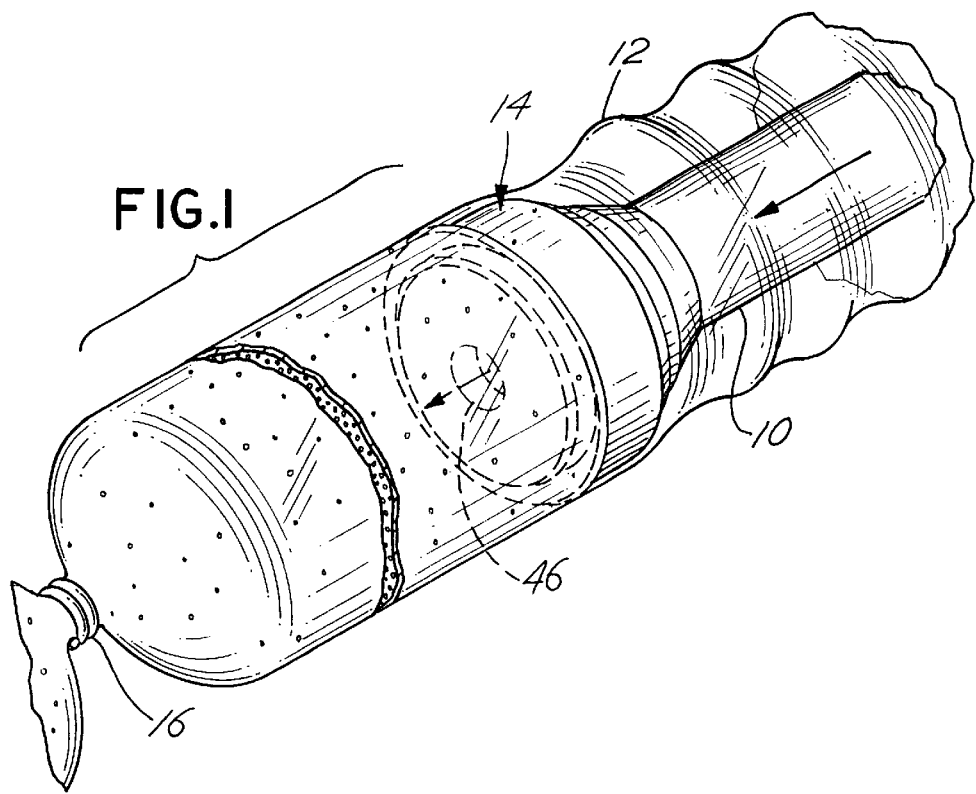
FIG. 1 is an isometric view of a typical product discharge horn or tube for the discharge of flowable product or material such as food materials or other flowable products and which incorporates the brake construction of the present invention.

In a typical product packaging machine of the type contemplated to use the invention, a product discharge tube or horn 10 is provided for receipt of flowable material and for discharge of that material therefrom in the direction indicated by the arrow in FIG. 1. Such materials may include food materials, for example, sausage and other meat products. Such materials may also comprise flowable construction materials such as caulking material. The materials may be in liquid or viscous form or in powder form. In any event the materials are discharged through the tube or horn 10 and packaged in casing material 12 which is rucked upon the horn 10.

The casing material 12 is released in a controlled manner as a result of the construction and operation of a brake assembly 14 attached at the end of the horn or tube 10. The invention relates, in particular, to the construction of the brake assembly 14 alone and in combination with a packaging apparatus of the type generally depicted in FIG. 1. In operation, casing material 12 which has been rucked upon the tube 10 is sealed at its outside end, for example, by a metal clip 16 or by some other means. Flowable material is then discharged from the tube 10 causing the rucked casing 12 to be released in a controlled manner by operation of the brake 14. As the casing 12 is released and filled, it is important that the fill material not leak between the tube 10 and casing 12 and that the casing 12 be released in a very controlled manner. Thus, it is important that all of the interfaces between casing 12 and the tube 10 as well the brake 14 be sealed so that leakage of the flowable material is avoided. Additionally, it is necessary to provide adequate resistance to removal of the rucked casing 12 from tube 10 via brake 14 yet not provide resistance that will result in tearing or destruction of the casing material 12 or back pressures of the flowable material in the tube 10 that preclude appropriate filling of the casing 12. Thus, utilization of a brake assembly 14 which is easily adjusted and which maintains its adjustment at a desired setting depending upon the casing material 12 being used and other factors is quite important.

Figure 2:
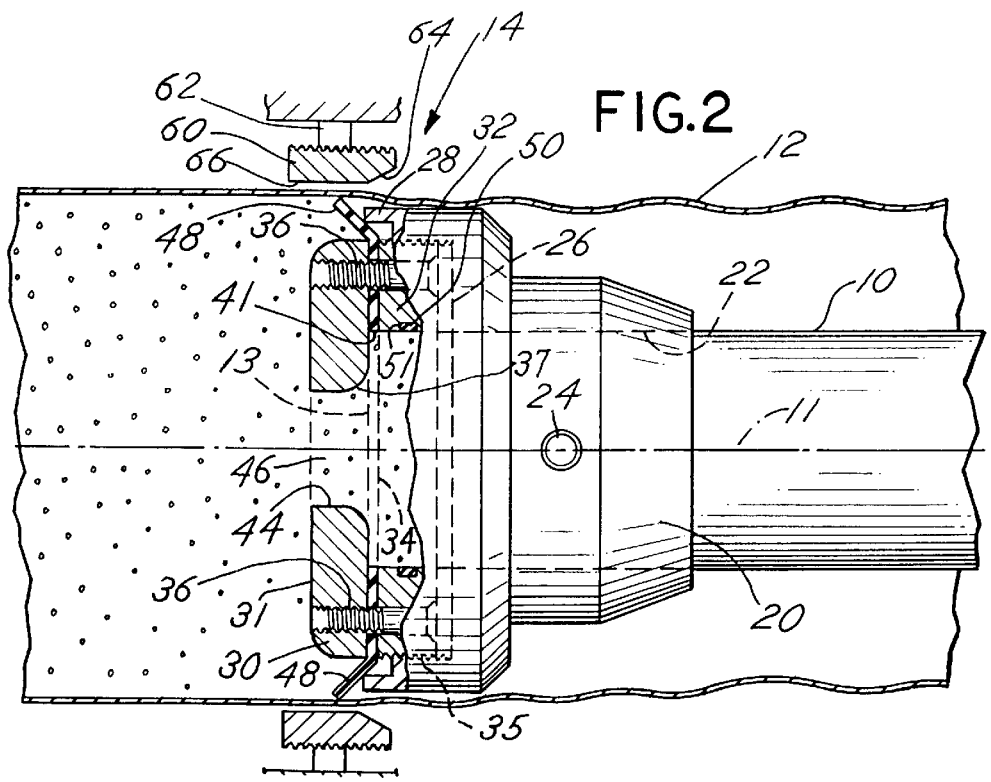
FIG. 2 is a side, cross-sectional view of the brake construction of the invention as incorporated on a discharge tube or horn in the manner depicted in FIG. 1.

The present invention contemplates such a brake 14 construction. Briefly, the present invention includes, as depicted in FIG. 2, a first ring member 20. The first ring member 20 has an annual configuration with a constant diameter through passage 22. The diameter of the through passage 22 is substantially equal to the outer diameter of the tube 10. Thus the first ring member may be slidably positioned on the tube 10 and attached thereto by a fastener 24. It is noted that the first ring member 20 is preferably positioned slightly back or axially displaced away from the front end 13 of the tube 10. Thus the tube 10, which has a center line axis 11, is coaxial with the center line of the annular first ring member 20. The first ring member 20 further includes an axial counterbore 26 and a circumferential rib 28 projecting axially and forwardly in the direction of material discharge from tube 10. The counterbore 26 has a diameter and shape and is threaded to threadably receive an annular seal carrier ring 30 as described below.

An annular seal carrier ring 30 is comprised of an outer ring member 31 and an inner ring member 32 of substantially equal diameter. Retained or sandwiched between the outer ring member 31 and the inner ring member 32 is an annular elastomeric seal 34. The elastomeric seal 34 is retained between outer ring member 31 and inner ring member 32 by means of fasteners such as fasteners 36 which engage the ring members 30 and 32 and retain them together. The inner ring member 32 preferably has an annular passage 42 with a diameter substantially equal to the outer diameter of the tube 10. In this manner the inner ring member 32 can be slidably received on the tube 10. The outside surface 35 of the inner ring member 32 is threaded so that it may be threaded into compatible or mating threads in the counterbore opening 26 to thereby allow adjustment of the axial position of the annular seal carrier rig 30.

The outer ring member 31 has an axial orifice or passage 44. The passage 44 is defined by a passaged wall 37 which is shaped in a desired fashion to control the outlet size of the brake 14. As depicted in FIG. 2, an outlet 46 of outer ring member 31 has a lesser diameter than the inner diameter of the tube 10. However this is not a limiting feature of the invention. The outlet 46 diameter may be greater and the transition passage 44 may provide for a shaped transition or flow path from the inside of the tube 10 through the outlet 46.

The elastomeric seal 34 includes an annular passage 41 therethrough. Preferably, the annual passage 41 has an internal diameter substantially equal to the external diameter of the tube 10. However other diameterial openings may be provided. The seal 34 has an outer diameter which is greater than the outer diameter of the first ring member 20. The elastomeric seal 34 thus includes an outer margin 48 which extends around the periphery or outer edge of the joined members 31 and 32. As the seal carrier ring 30, comprised of members 31 and 32, is threaded into the counterbore 26, the circumferential rib 28 will engage and bias the elastomeric seal 34 and particularly the outer margin 48 thereof. In this manner, the radial extent of the seal 34 from axis 11 is controlled by the resultant flexure of seal 34. Likewise, engagement of the seal 34 with casing material 12 is controlled in this manner by adjusting the angle of the margin 48 relative to axis 11. Thus, the seal 34 can be distorted or shaped in any desired fashion to provide a wide range of diameterial engagement dimensions to a maximum outer extent of the seal 34. In a preferred embodiment, the margin 48 defines an annular planar member which projects outwardly and in the direction of product flow through tube 10.

The choice of the seal material 34 and thickness and shape of the seal 34 and margin 48 will have an impact on the strength of the engagement between the brake and casing material 12. Thus, with the construction described, it is easy to control the interaction between the elastomeric seal 34, i.e. margin 48, and the casing material 12. The margin 48 typically projects in the direction of removed casing material 12 as shown in FIG. 2. However, the brake may be constructed to provide for extension in the opposite direction.

Another important feature of the invention is the inclusion of an O ring seal 50 intermediate the inside diameter of the inside seal carrier ring member 32 and the outer diameter of the tube 10. The seal 50 comprises an elastomeric O ring seal 50 in an annular channel 51 along the surface of the tube 10 at a position which depends upon the rotation or threading of the carrier ring member 32. The seal 50 prevents leakage of fill material discharged through tube 10.

A further feature of the invention comprises an annular external ring 60 which fits over the carrier ring heretofore described. The annular ring 60 is mounted in a holder 62 and may be adjusted by movement in an axial direction within the holder 62. For example, the ring 60 may be externally threaded and cooperate with internal threads on the holder 62 to provide for axial adjustment of the external ring member 60 with respect to the other ring members previously described and the horn 10.

The ring 60 includes a beveled surface 64 and a constant diameter internal surface 66. The beveled surface 64 provides a guide for casing 12 which feed through the space intermediate the external ring 60 and the elastomeric seal 48. The elastomeric seal 48 is typically aligned with a portion of the constant diameter surface 66 of the external ring 60. The external ring 60 may have a constant diameter or the diameter thereof may be variable about the internal circumference of the ring 60. Further, alternative to the ring 60 may be substituted and are considered generally equivalent thereto. For example, a segmented series of arcuate blocks may be provided about the periphery of the internal brake construction. However, the preference is that the external ring 60 is a closed loop ring.

In practice, the casing material 12 is rucked upon the horn 10. A leading edge of the casing material 12 is then fitted over the brake mechanism elastomeric seal 34. The tension between the aft casing 12 and the seal 34 can be easily adjusted by adjusting the annular seal carrier ring 30 axially inwardly or outwardly within the cavity 26. Adjustment of seal 34 may thus accommodate many types of casing 12 having a wide variety of plasticity. The construction is especially useful with casing 12 of limited plasticity. Seals 34 may be replaced or substituted to accommodate different casings 12.

It is thus possible to vary the construction and operation of the improved brake mechanism of the invention without departing from the spirit and scope thereof. The particular shapes of the various elements may be adjusted. The dimensional characteristics and material of the elastomeric seal, for example, may be adjusted or altered. The seal, for example, does not need to be entirely continuous or circular about its outer periphery. It may be elliptical, for example. The internal passage through the seal does not necessarily need to be equal to the tube 10 internal diameter in order to practice the invention. Thus, the invention is to be limited only by the following claims and equivalents thereof.

What I claim is:

1. In an apparatus for discharge of a flow of viscous flowable material into a casing, said apparatus of the type including an elongate discharge tube having an axis and with a discharge end outlet, said tube designed to include rucked casing material on the tube for filling with the flowable material upon withdrawal of casing from the tube as the flowable material is discharged from the end of the tube, said end of the tube including a braking mechanism, the improvement of an adjustable braking mechanism for use in combination with casing material of limited plasticity, said improvement comprising, in combination:

(a) a first ring member attached to the end of the tube, said first ring member including a circumferential rib projecting axially outwardly in the direction of flowable material discharge from the tube; and (b) a first annular elastomeric seal having an outer edge with a diameter greater than the diameter of the first ring member and an inner diameter less than the inner diameter of the projecting rib; and an annular seal carrier ring having an outer diameter less than the inner diameter of the projecting rib, said seal carrier ring supporting the inner edge of the first seal, said first seal and carrier ring adjustably mounted within the annular first ring member for movement therewith in an axial direction whereby the projecting circumferential rib engages the elastomeric seal and thereby controls the effective outer extent of the elastomeric seal edge from the tube axis upon axial movement of the carrier ring by adjustably positioning the elastomeric seal to engage the inside of casing as the casing is withdrawn from the tube.

2. The improvement of claim 1 further including an elastomeric sealing member intermediate the seal carrier ring and the outside of the tube.

3. The improvement of claims 1 wherein the carrier ring includes an annular passage having a section with a diameter less than the internal diameter of the discharge tube.

4. The improvement of claims 1, 2, or 3 wherein the carrier ring is comprised of an outer ring member and an inner ring member, and the elastomeric seal is retained between the inner ring member and the outer ring member.

5. The improvement of claim 4 wherein the outer ring member has a diameter less than the diameter of the inner ring member.

6. The improvement of claim 4 wherein the outer ring member includes a shaped inner passage from the tube.

7. The improvement of claim 1 or 2 including a casing brake attachment member spaced from the carrier ring for passage of casing between the attachment member and the carrier ring.

8. The improvement of claim 7 wherein the attachment member is a ring member.

9. The improvement of claim 8 wherein the attachment ring member includes a variable internal radius.

* * * * *

UNITED STATES PATENT AND TRADEMARK OFFICE
CERTIFICATE OF CORRECTION

PATENT NO.   : 6,401,885 B1
DATED        : June 11, 2002
INVENTOR(S)  : Whittlesey It is certified that error appears in the above-identified patent and that said Letters Patent is hereby corrected as shown below:

<u>Title page,</u>
The following information should replace the original Assignee name:
-- Delaware Capital Formation, Inc. --

Signed and Sealed this

Twenty-ninth Day of April, 2003

JAMES E. ROGAN
*Director of the United States Patent and Trademark Office*